US007057005B2

(12) United States Patent
Rohde et al.

(10) Patent No.: US 7,057,005 B2
(45) Date of Patent: Jun. 6, 2006

(54) PROCESS FOR PREPARING BRANCHED POLYCARBONATE

(75) Inventors: Susanne Rohde, Harsefeld (DE); Bernhard Elbert, Stade (DE)

(73) Assignee: Dow Global TechnologiessInc., Midland, MI (US)

( * ) Notice: Subject to any disclaimer, the term of this patent is extended or adjusted under 35 U.S.C. 154(b) by 0 days.

(21) Appl. No.: 10/880,232

(22) Filed: Jun. 29, 2004

(65) Prior Publication Data

US 2005/0020804 A1 Jan. 27, 2005

Related U.S. Application Data

(60) Provisional application No. 60/489,404, filed on Jul. 23, 2003.

(51) Int. Cl.
*C08G 64/00* (2006.01)

(52) U.S. Cl. ...................... 528/196; 524/262; 524/492; 525/66; 525/67; 525/146; 525/147; 528/193; 528/198

(58) Field of Classification Search .................. 525/66, 525/67, 146, 147; 528/193, 196, 198; 524/262, 524/492

See application file for complete search history.

(56) References Cited

U.S. PATENT DOCUMENTS

| | | | | |
|---|---|---|---|---|
| 2,999,835 | A | 9/1961 | Goldberg | 260/42 |
| 3,038,365 | A | 6/1962 | Peterson | 84/1.26 |
| 3,169,121 | A | 2/1965 | Goldberg | 260/47 |
| 3,334,154 | A | 8/1967 | Kim | 260/860 |
| RE27,682 | E | 6/1973 | Schnell et al. | 260/47 |
| 4,299,928 | A | 11/1981 | Witman | 526/67 |
| 4,535,143 | A | 8/1985 | Price et al. | 528/174 |
| 4,946,927 | A | 8/1990 | Ebert et al. | 528/198 |
| 4,962,144 | A | 10/1990 | Babillis et al. | 524/118 |
| 5,037,942 | A | 8/1991 | Hunt et al. | 528/198 |
| 5,321,116 | A * | 6/1994 | Marks et al. | 528/204 |
| 5,362,839 | A | 11/1994 | Munjal et al. | 528/198 |
| 5,412,060 | A | 5/1995 | Wulff et al. | 528/198 |
| 5,412,064 | A * | 5/1995 | Osby et al. | 528/298 |
| 6,225,436 | B1 * | 5/2001 | Eiffler et al. | 528/196 |
| 6,288,204 | B1 | 9/2001 | Ogawa et al. | 528/196 |

FOREIGN PATENT DOCUMENTS

| | | |
|---|---|---|
| EP | 0 575 870 | 12/1993 |
| EP | 0 600 447 | 6/1994 |
| EP | 0 894 816 | 2/1999 |
| JP | 49-045318 A | 4/1974 |
| JP | 59-191719 | 10/1984 |

OTHER PUBLICATIONS

Marks, M.J; Munjal, S; Namhata, S.; Scott, D.C.; Bosscher, F.; De Letter, J.A.; Klumperman, B; "Randomly Branched Bisphenol A Polycarbonates. I. Molecular Weight Distribution Modeling, Interfacial Synthesis, and Characterization" Journal of Polymer Science: Part A, Polymer Chemistry, vol. 38, 560-570 (2000).

* cited by examiner

*Primary Examiner*—Terressa Boykin

(57) ABSTRACT

The present invention is a process for producing branched polycarbonate providing for optimum utilization of the branching agent. It was surprisingly found that adding at least a portion of the coupling catalyst to the polymerization at a point during the oligomerization in the reaction results in a higher degree of branching and improved rheological properties.

10 Claims, No Drawings

PROCESS FOR PREPARING BRANCHED POLYCARBONATE

CROSS REFERENCE STATEMENT

This application claims the benefit of U.S. Provisional Application No. 60/489,404, filed Jul. 23, 2003.

The present invention relates to an improved process for preparing branched polycarbonates having an improved technique for adding a coupling catalyst compound. Branched polycarbonate resins and processes for preparing branched polycarbonates are known in the art. In the known processes for the preparation of branched polycarbonate resins, a dihydric phenol, such as bisphenol A is reacted with carbonate precursor such as phosgene using a tri- or higher-functional hydroxyl or acyl compounds as branching agents to provide long chain branching. As in the production of the standard linear polycarbonates, such processes also use mono-functional compounds such as monophenols as chain terminators, and phase transfer catalysts such as quaternary amines that act as coupling catalysts and increase the polymer molecular weight. Branched polycarbonate resin products are shear sensitive and provide improved processing performance in certain applications such as blow molding. In the known branched polycarbonate resin processes, such as JP 49-045318A and U.S. Pats. Re 27,682; U.S. Pat. Nos. 6,225,436 and 6,288,204, it is taught that the coupling catalyst such as TEA can be added at varying times or points in the process but there is no criticality associated with the addition timing nor disclosure of benefits to branching agent efficiency or resin performance. Therefore, there is also a continuing need for improved branched PC processes providing better combinations of resin performance and raw material utilization efficiency.

An object of the present invention is a new process for preparing polycarbonates in which the coupling catalyst compound functions more effectively and provides better branching efficiency and shear sensitivity benefits in the process and product.

Accordingly, in one aspect, the present invention is a process for producing branched polycarbonate providing for optimum utilization of the branching agent. More specifically, the present invention is a process for producing a branched polycarbonate composition from dihydric phenol, carbonate precursor, multifunctional phenolic branching agent and monophenolic chain terminator using a coupling catalyst which process comprises the sequential steps of:

a) combining a dihydric phenol, a multifunctional phenolic branching agent, base and water to form the reaction mixture, b) then adding at least part of the carbonate precursor and the water immissible organic solvent and reacting the polymerization mixture, partially oligomerizing the dihydric phenol, c) then adding a monophenolic chain terminator and at least a part of the coupling catalyst and base to the reaction mixture, d) adding the balance of the carbonate precursor (if any) and continuing the reaction of reacting the polymerization mixture, e) adding the balance, if any, of the coupling catalyst, f) completing the polymerization reaction.

In one preferred embodiment, all of the coupling catalyst is added in step c) in the presence of the partially oligomerized dihydric phenol.

In another preferred embodiment there is a second or late addition of coupling catalyst separate from and after the addition of the first coupling catalyst added in step c). More preferably, the first coupling catalyst added in step c) is added to the oligomerizing reaction mixture at the point where the Mw is between about 1,200 and about 1,800 g/mole, preferably where the Mw is between about 1,400 and about 1,600 g/mole. In another embodiment, the first addition of the coupling catalyst is in an amount of from 0.5 to 20 mole percent (%) of the total coupling catalyst amount that is added. In another preferred embodiment, the second coupling catalyst component is added to the reaction mixture at the point where the Mw has increased to at least about 10,000.

The polycarbonate polymerization process and product improvements which are the subject of this invention relate to the timing of the addition of the coupling catalyst to the polycarbonate reaction mixture. It has surprisingly been found that the branching is more effective when its addition is started during the oligomerization and/or is split and a minor portion of the coupling catalyst is added relatively early in the process and the balance of the coupling catalyst is added later. Using one or both of these techniques for addition of the coupling catalyst, the present invention provides improved branched polycarbonates and an improved process for their production using otherwise generally known reactants and processes.

Dihydric Phenol

The dihydric phenols employed in the practice of the present invention are generally known in the carbonate polymerization art and in which the only reactive groups under condensation polymerization conditions are the two phenolic hydroxyl groups. Useful dihydric phenols are for example those of the general formula HO-Z-OH, wherein Z comprises a mono- or poly-aromatic diradical of 6–30 carbon atoms, to which the phenolic oxygen atoms are directly linked. The aromatic group(s) may comprise one or more heteroatoms and may be substituted with one or more groups, for example one or more oxygens, nitrogens, sulfur, phosphorous and/or halogens, one or more monovalent hydrocarbon radicals, such as one or more alkyl, cycloalkyl or aryl groups and/or one or more alkoxy and/or aryloxy groups. Preferably, both phenolic hydroxy groups in the dihydric phenol HO-Z-OH are arranged in para-positions on the aromatic ring(s).

The dihydric phenols employed in the process of the present invention include the bis(aryl-hydroxy-phenyl)alkylidenes including their aromatically and aliphatically substituted derivatives, such as disclosed in U.S. Pat. No. 2,999,835; U.S. Pat. No. 3,038,365; U.S. Pat. No. 3,334,154 and U.S. Pat. No. 4,299,928; and aromatic diols such as described in U.S. Pat. No. 3,169,121.

Preferred examples of dihydric phenols of the general formula HO-Z-OH are bis(hydroxyphenyl)fluorenes, such as 9,9-bis-(4-hydroxyphenyl) fluorene; dihydroxy benzenes and the halo- and alkyl-substituted dihydroxy benzenes, such as hydroquinone, resorcinol, or 1,4-dihydroxy-2-chlorobenzene; alpha,alpha'-bis(hydroxyphenyl)-diisopropylbenzenes; dihydroxybiphenylenes, such as 4,4'-dihydroxydiphenyl; the halo- and alkyl substituted dihydroxybiphenylenes; bis(hydroxyphenyl)alkanes, such as bis(4-hydroxylphenyl) methane, 1,1-bis(4-hydroxyphenyl)ethane, 1,1-bis(4-hydroxyphenyl) propane, or, most preferably, 2,2-bis(4-hydroxyphenyl)propane ("bisphenol A"); alkyl-, aryl- or halosubstituted bis(hydroxyphenyl) alkanes, such as 1-phenyl-1,1-bis(4-hydroxyphenyl) ethane ("bisphenol AP"), 2,2-bis(3,5-dibromo-4-hydroxyphenyl) propane ("tetrabromo bisphenol A"), 2,2-bis(3,5-dimethyl- 4-hydroxyphenyl)propane ("tetramethyl bisphenol A"); optionally alkyl-, aryl- or halosubstituted bis(hydroxyphenyl)cycloalkanes; optionally alkyl-, aryl- or halosubstituted bis(hydroxyphenyl)ethers; optionally alkyl-, aryl- or halosubstituted bis(hydroxyaryl)sulfones, preferably bis(hydroxyphenyl)sulfones; or bis(hydroxyphenyl)sulfoxides. Other examples of suitable dihydric phenols are listed in U.S. Pat. No. 4,627,949, column 2, line 68-column 3, lines 1–22, in U.S. Pat. No. 4,962,144, column 2, lines 17–46 and in EP 423 562, page 2, lines 24–55 and page 3, lines 1–19. Mixtures of two or more dihydric phenols may also be used, for example a mixture comprising 1–99 percent of bisphenol A and 99–1 weight percent of another dihydric phenol, such as 9,9-bis-(4-hydroxyphenyl) fluorene.

Among the most preferred dihydric phenol suitable for production of polycarbonate in the present invention are bisphenol A, bisphenol A P, tetrabromo bisphenol A, and tetramethyl bisphenol A. The most preferred dihydric phenol is bisphenol A.

Branching Agent

Suitable branching agents are generally tri- or higher functional hydric compounds or their derivatives and are typically one or more of the following: phloroglucin; phloroglucid; 2,6-dimethyl-2,4,6-tri(4-hydroxyphenyl)heptene-3; 4,6-dimethyl-2,4,6-tri(4-hydroxyphenyl) heptene-2; 4,6-dimethyl-2,4,6-tri(4-hydroxyphenyl)pentene-2; 4,6-dimethyl-2,4,6-tri(4-hydroxyphenyl)pentane 1,3,5-tri(4-hydroxyphenyl)benzene; 1,3,5-tri(2-hydroxyphenyl) benzol; 1,1,1-tri(4-hydroxyphenyl)ethane; 2,6-bis(2-hydroxy-5-methylbenzyl)-4-methylphenol; tetra(4-hydroxyphenyl)methane; trisphenol; bis(2,4-dihydroxyphenyl) ketone; 1,4-bis(4,4-dihydroxytriphenylmethyl)benzene; (,(', ("-tri(4-hydroxyphenyl)-1,3,5-tri-isopropylbenzene; 3,3-bis (4-hydroxyaryl)oxyindole; isatinbisphenol; 5-chloroisatin; 5,7-dichloroisatin; 5-bromoisatin; trimellitic acid; pyromellitic acid; benzophenonetetracarboxylic acid; and including for the appropriate compounds, the acid chlorides or other condensation reactive derivatives thereof such as trimellitic trichloride, trimesoylchloride and trimellitic anhydride chloride. Specifically preferred branching agents include phloroglucin; phloroglucid; 1,1,1-tri(4-hydroxyphenyl) ethane (THPE); trimellitic acid; trimellitic trichloride (TMTC); pyromellitic acid; benzophenonetetracarboxylic acid and acid chlorides thereof; 2,6-bis(2-hydroxy-5-methylbenzyl)-4-methylphenol and 1,3,5-tri(4-hydroxyphenyl)benzene.

A branching agent is typically used in amounts of from about 0.25 to about 1.5 mole percent based on moles of the dihydric phenol.

Carbonate Precursor

A carbonate precursor suitable for use in the present invention contains leaving groups which can be displaced from the carbonyl carbon in attack by the anion of a dihydric phenol compound, and includes but is not necessarily limited to carbonyl halides or acyl halides, of which, the most preferred is phosgene. The carbonate precursor, preferably phosgene, is contacted with the dihydric phenol compound in the aqueous alkaline solution and can be added as a solution in the water-immissible non-reactive organic solvent and thoroughly mixed with the aqueous phase or can be bubbled into the reaction mixture in the form of a gas and preferentially dissolve and locate in the organic phase. The carbonate precursor is typically used in an amount of 1.0 to 1.8, preferably 1.2. to 1.5, moles per mole of dihydric phenol compound.

Chain Terminator

A chain terminator is a monofunctional compound containing a functional group, frequently a hydroxyl group, which will produce an anion capable of displacing an unreacted hydroxyl or carbonic acid ester group which remains on the end of the oligomer or polymer chain. Representative of the terminators which are useful for the production of polycarbonates in the present invention are phenol and the derivatives thereof, saturated aliphatic alcohols, metallic sulfites, alkyl acid chlorides, trialkyl- or triarylsilanols, monohalosilanes, amino alcohols, trialkyl alcohols, aniline and methylanaline. Of these, phenol, para-t-butyl phenol (PTBP), p-cumyl phenol and para-t-octyl phenol (4-(1,1,2,2-tetramethylbutyl)-phenol or PTOP) are the most preferred for use in the present invention.

Coupling Catalyst

In this process, the coupling catalyst is generally used in amounts typically ranging from about 0.001 to about 0.1 moles per mole of dihydric phenol compound. The catalyst is preferably added in amounts of at least about 0.0025, preferably at least about 0.008 and more preferably at least about 0.015 moles per mole of dihydric phenol compound. The catalyst is preferably added in amounts up to about 0.15, preferably up to about 0.1 and more preferably up to about 0.075 moles per mole of dihydric phenol compound. As will be discussed below, the catalyst addition is started during oligomerization and preferably split and with a second part added later in the polymerization process.

Such coupling catalysts include a tertiary amine such as triethylamine (TEA), dimethyl amino pyridine or N,N-dimethyl aniline; a cyclic aza compound such as 2,2,6,6-tetramethyl piperidine or 1,2-dimethylimidazole; an iminoether or iminocarboxylate compound such as 1-aza-2-methoxy-1-cycloheptene or t-butyl-cyclohexyliminoacetate; or a phosphonium, sulfonium, arsonium or quaternary ammonium compound such as cetyl triethylammonium bromide. Tertiary amines are the preferred coupling catalysts for use in improved process according to the present invention and include trimethylamine, triethylamine, tributylamine, and 4-N,N-dimethylaminopyridine.

Polymerization Process

The present invention is applicable to the generally known interfacial polymerization process which can be done either batchwise or continuously.

As is known, a standard interfacial process (also referred to as phase boundary process) for aromatic carbonate polymer polymerization involves the reaction of the dihydric phenol such as a bisphenol A, and the carbonate precursor such as phosgene or other disubstituted carbonic acid derivative, or a haloformate (such as a bishaloformate of a glycol or dihydroxy benzene). Initially the dihydric phenol compound is at least partially dissolved and deprotonated in an aqueous alkaline solution to form bisphenolate (phenate). The carbonate precursor is supplied to the process, optionally dissolved in an organic solvent which forms the second of the two phases. The aqueous alkaline solution has a pH in excess of 7.0, often in excess 8.0 or 9.0, preferably at least 13 to 14, and can be formed in water by adding base such as caustic soda, NaOH, or other bases such as alkali metal and alkaline earth metal phosphates, bicarbonates, oxides and hydroxides. Base is typically used over the course of the interfacial polymerization and further added to the reaction mixture where appropriate to maintain the proper pH. In total this usually amounts to the addition of base in an amount of 2 to 4, preferably 3 to 4, moles base per mole of dyhydric phenol compound. The base, such as caustic soda, is added to the reaction mixture to adjust the pH of the mixture to a level at which the dihydric phenol compound is at least partially converted to dianionic form. A reducing agent such as sodium sulfite or sodium dithionite can also be advantageously added to the reaction mixture as well.

The other phase of the two phase mixture is a non-reactive organic solvent immissible with water and in which the carbonate precursor and polycarbonate product are typically soluble. Representative solvents include chlorinated hydrocarbons such as methylene chloride, 1,2-dichloroethane, tetrachloroethane, chlorobenzene, and chloroform, to which tetrahydrofuran, dioxane, nitrobenzene, dimethyl sulfoxide, xylene, cresol or anisole may be added, if desired.

As mentioned above, the mixture is agitated in a manner which is sufficient to disperse or suspend droplets of the solvent containing the carbonate precursor in or otherwise contact the precursor with the aqueous alkaline mixture. Reaction between the carbonate precursor and the phenate reactant in the aqueous phases yields primarily the bis-ester of the carbonate precursor with the dihydric phenol compound which can further react with more dihydric phenol units to form longer chain oligomers and polymers. Some dihydric phenol does not react and remains as a monomer and some remains as shorter chain, intermediate bis-esters. For example, if the carbonate precursor is an acyl halide such as phosgene, these intermediates are primarily bischloroformates, although some end groups may instead be a terminator residue, phenolate ion or unreacted hydroxy group. With the addition of the coupling catalyst, the coupling reactions occur between ester moieties to polymerize the carbonate polymer.

The polycarbonate forming reaction can be run at a pH from above 7.0 to 14, and at a temperature between 0° C. to 100° C., although usually not in excess of the boiling point (corrected for the operating pressure) of the solvent used. Frequently, the reaction is run at a temperature of 0° C. to 45° C.

As is known, the use of branching agents provide the polycarbonate with long chain branching that in turn provides special rheological properties in the polymer. In this process, the branching agent is usually added to the reaction mixture in combination with the dihydric phenol monomer. However, the point at which the branching agent is added has not been found to have a significant effect on the branching or other polymer properties as long as it is added to the reaction mixture at an early stage in polymer chain growth and before there has been signification termination.

A terminator is typically used and can be added to the monomers before, during or after the time the dihydric phenol is contacted with the carbonyl precursor but is preferably added somewhat afterward. Any terminator anion capable of attacking a hydroxy or carbonic acid ester end group on a polymer chain is also capable of undesirably either (1) attacking unreacted molecules of the initial charge of the carbonate precursor or (2) displacing end groups before a chain has an opportunity to grow to the desired length. The practice in the art of adding chain terminator to the reaction mixture prior to introduction of the carbonate precursor consequently allows for the formation of undesired carbonate byproducts by the occurrence of both of the aforementioned results. Carbonate byproduct content detracts from the desirable properties and qualities of polycarbonate, and in most applications, may be seen as an impurity therein. For example, low molecular weight carbonates have a negative impact on the mechanical properties of the final polycarbonate composition.

Split and/or Early Addition of Coupling Catalyst

As mentioned above, it was surprisingly found that adding at least a portion of the coupling catalyst to the polymerization at a point during the oligomerization in the reaction results in a higher degree of branching and improved rheological properties. It is believed that these benefits are obtained by the addition of the coupling catalyst when there is a mixture of both reactive phosgene and oligomeric molecules in the reaction mixture and before complete oligomerization and reaction of the phosgene and diphenol to chloroformate and sodium phenate groups. It is addition of the coupling catalyst at this stage that is being referred to as “early” or “during oligomerization”.

The most improved rheological properties were observed by adding from about 1 to about 20% of the whole branching agent amount somewhat earlier, during the oligomerization process. The benefits of this discovery provide a process where about 20% to 30% less branching agent can be employed and maintain product performance or significantly improved product performance can be obtained maintaining a standard amount of the branching agent.

In the situations where TEA or a similar coupling catalyst has previously been used in the production of branched polycarbonate, the whole amount of the coupling catalyst has typically been added at one time, either with the initial feed of monomers prior to addition of the carbonate precursor or after the phosgene had been added to the reaction and after the complete oligomerization and reaction of the phosgene and diphenol to chloroformate and sodium phenate groups.

Instead, in the process according to the present invention for early and/or split addition of the coupling catalyst, roughly same amount or somewhat reduced amounts of coupling catalyst are used but it is added during oligomerization and/or split into two components with one component being added during the oligomerization. This first coupling catalyst component is added to the oligomerizing reaction mixture at the point where the Mw is between about 1,200 and about 1,800 g/mole, preferably between about 1,400 and about 1,600 g/mole, and more preferably when the Mw is about 1,500 g/mole. Subsequently, the balance of the coupling catalyst, the “second” or “late” coupling catalyst component, if any, is added to the reaction mixture at the point where the Mw has increased to at least about 10,000, preferably to at least about 15,000 and is more preferably between about 15,000 and about 45,000 g/mole.

The resulting products are observed to have improved melt viscosity and shear sensitivity with no adverse effects in the process or on other polymer properties such as molecular weight and toughness. It is theorized that the measurable change is due to faster and therefore longer chain growth in the branching chains.

According to the present invention it is found that the amount of the first coupling catalyst addition should be at least 0.5 percent of the total coupling agent amount that is added, preferably at least 2% and more preferably at least 3.5%. As far as upper limits, the amount of the first coupling catalyst addition in extreme case can be 100 percent of the total coupling agent amount that is added, but is preferably less than or equal to 20% and more preferably less than or equal to 7%.

Upon completion of polymerization, the organic and aqueous phases are separated to allow purification of the organic phase and recovery of the polycarbonate product therefrom. The organic phase is washed as needed in a centrifuge with dilute base, water and/or dilute acid until free of unreacted monomer, residual process chemicals and/or other electrolytes. Recovery of the polycarbonate product can be effected by spray drying, steam devolatilization, direct devolatilization in a vented extruder, or precipitation by use of an anti-solvent such as toluene, cyclohexane, heptane, methanol, hexanol, or methyl ethyl ketone.

As mentioned above, the more efficient use of the branching agent in the process provides resins that have the viscosity ratio and shear sensitivity of resins having a relatively higher content of branching agent. As used herein, the viscosity ratio is defined as the ratio of the resin viscosity measured under no shear ($\eta_0$) to the resin viscosity measured at a higher shear rate, for example, 9 $s^{-1}$, which ratio is abbreviated as $\eta_0/\eta_{(\gamma=9\ s^{-1})}$. For example, according to the present invention, resins are prepared at a 30% reduction of the branching agent concentration but having about the same viscosity ratio as a typical branched PC which is commercially available and prepared according to the prior art polymerization technology.

The invention is illustrated in the following examples. The following general polymerization technique was used in all of the individual Experiments that are summarized in the Table below.

The reactor is a temperature controlled, agitated, 10-litre, jacketed glass reactor. The supplies of water, caustic, dichloromethane, tertiary-butyl-phenol solution and triethylamine solution are connected with a control system to provide proper feed rates and are padded with nitrogen to prevent oxidation of the described raw materials. A pH electrode in the reactor allows the addition of additives at a controlled pH level during phosgenation. For the polymerizations described below the following raw material amounts and conditions are used:

- Bisphenol-A (BPA): 0.700 kg (3 moles)
- Tris hydroxy phenyl ethane (THPE): 3.5 g
- Water: 3.870 kg
- Caustic Solution (30 wt % NaOH in water): 1.070 kg
- Methylene chloride: 2.000 kg
- Phosgene flow: 0.04 g/s (0.4 mmole/s)
- Total Phosgene Feed: 405 g (4.1 mole)
- Reaction temperature: between 20° C. and 40° C., normally 25° C.
- Agitator Speed: 1000 rpm
- Tertiary-Butyl Phenol (PTBP) Solution: 0.60 kg (11.6 g or 77 mmoles PTBP in 600 grams methylene chloride)
- TEA Solution amount: 2000 grams of a 0.36 wt % solution of TEA in methylene chloride (i.e., 7.2 g or 71 mmol TEA) to provide 1340 ppm (in org. Phase)

The bisphenol-A (0.70 kg) is deoxygenated in a glass flask under vacuum for 10 minutes. Then it is kept under nitrogen to remove traces of oxygen. The deoxygenated Bis-A is added into the constantly stirred 10-litre double wall glass reactor which was purged with nitrogen. To dissolve the bisphenol-A, argon purged water (3.87 kg) and the caustic (1.07 kg of 30 wt % sodium hydroxide) are added. During dissolution a nitrogen pad is above the mixture to exclude oxygen. After all the BPA has dissolved, the THPE and 2.0 kg dichloromethane were added, the reactor is closed and stirred for 20 minutes under a argon atmosphere and then the phosgenation was started. During the phosgenation and throughout the rest of the polymerization reaction the reaction mixture is constantly stirred. At the beginning of the reaction the initial pH is about 13. The phosgenation oligomerization reaction provides primarily the following intermediate along with some byproducts:

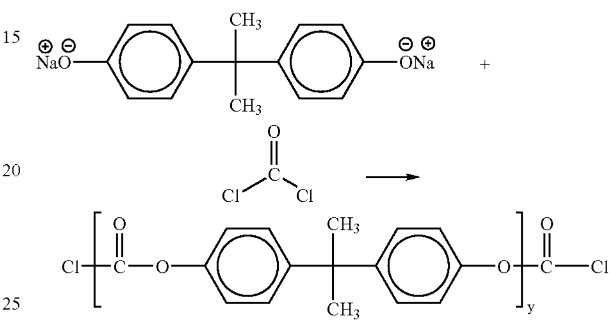

where y is generally less than about 10. About of a third of the oligomers are end capped as sodium salt.

After about 55 minutes and a third of the total phosgene amount has been added (125 grams, 1.26 moles), the tertiary-butyl phenol (PTBP) was fed to the reaction to control molecular weight. There is a caustic addition of 600 grams of 30% caustic (i.e. 180 grams NaOH) after about 112. minutes of phosgene addition. The first or "early" addition of 3.5% of the TEA (10.5 grams of the 0.36 wt % solution of TEA in dichloromethane) was made after the caustic addition. This was after about 120 minutes and about three quarters of the total phosgene (270 g or 2.7 mole) was added. At this time the polymer molecular weight was about 1,500 g/mole and about 3.8 mmoles (0.38 grams) of TEA were added. After the rest of the phosgene had been added, the phosgenation was stopped and the system is purged with nitrogen for 20 minutes. Then the coupling was completed by the "late" addition of 96.5% or the balance of the TEA solution, which amounted to 289.5 grams of the 0.36 wt % solution of TEA in dichloromethane) to provide about 3000 ppm TEA in the organic phase. After addition of the coupling catalyst, 2 kg methylene chloride is added and the solution is mixed for 15 minutes to finish the coupling reaction. When stirring is stopped the solution starts to separate into aqueous and organic phase. The polymer solution was tested to be free of phosgene and chloroformate end groups by phosgene tape. Then the aqueous phase and the organic phase are separated, the organic phase is washed is to remove all the impurities from the polymer solution and the polycarbonate is recovered by mixing with n-heptane, devolatilized, dried and extruded.

The specific experiments that were performed in this fashion are summarized below where the changes in any of the process steps are noted. The resulting polymer samples were analyzed by GPC equipped with a diode-array-detector (DAD) and a viscosity-detector to determine the molecular weight, the viscosity and the degree of branching using refractive index (RI) and light scattering (LS) detector.

| Experiment Number | 1 | 2 | 3 | A |
|---|---|---|---|---|
| THPE-content Mol % | 0.5 | 0.5 | 0.37 | 0.5 |
| TEA-total amount added | 7.2 g 71 mmol | 7.2 g 71 mmol | 7.2 g 71 mmol | 7.2 g 71 mmol |
| % TEA "Early" | 3.5 | 7 | 7 | |
| % TEA "Late" | 96.5 | 93 | 93 | 100 |
| Mn (g/mole) | 6672 | 7067 | 11387 | 4951 |
| Mw (g/mole) | 56931 | 51923 | 55649 | 46861 |
| Mz (g/mole) | 137862 | 121734 | 256720 | 118107 |
| Melt Flow Rate | | | | |
| Dispersity | 8.5 | 7.3 | 4.9 | 9.5 |
| long chain branching (branches per 1000 monomer units) | 1.78 | 1.40 | 1.59 | 1.31 |
| Viscosity ratio $\eta_0/\eta_{(\gamma=9\ s^{-1})}$ | 7.5 | Not analyzed. | 6.9 | 3.3 |
| Comments | Early addition of 3.5% of total TEA together with second caustic shot, 96.5% of TEA in coupling step at the end of the reaction. | Early addition of 7% of total TEA; together with second caustic shot; 93% of TEA in coupling step at the end of the reaction. | Early addition of 7% of total TEA together with second caustic shot, 93% of TEA in coupling step at the end of the reaction. | 100% "Late" TEA Addition. 0.5 wt % THPE; TEA addition only in the coupling step at the end of the reaction. |

The branching and rheological improvements in the polymers were shown by analysis on a Physica US 200 oscillating rheometer at 260° C. For the measurement the polymer sample was dissolved in methylene chloride and the samples were made by evaporation of the solvent in a Petri dish. These samples were dried under vacuum at 120° C. for about 12 hours. After drying, 0.4 gr. of the sample was compression molded at a pressure of about 4000 kg/cm2 into a film specimen with a diameter of 10 mm and a thickness of 3 mm, dried again for 4 hours under vacuum and used for testing. The rheometer testing confirmed that improved (greater) shear sensitivity was provided in proportion to the long chain branching of the polymer. In other words, the viscosity of the polymer is reduced when increasing the shear on the polymer.

The analysis of the samples by GPC refractive index (RI) and light scattering (LS) is shown in Table 1 above. In Table 1 it can be seen that the 3.5% early addition gives higher molecular weight material. The calculated branching figures (long chain branching over 1000 monomer units) are 1.31, 1.78 and 1.40 for 0, 3.5%, and 7% early partial TEA addition. Since this value is higher with higher amounts of branching, it can be seen that early partial TEA addition increases the amount of branching. The high figure (1.78) of the 3.5% addition is caused by the relatively higher amount of high molecular weight fractions. Therefore the average value is higher than that of the 7% addition.

It is also important to note that in Experiment 3 only 0.37 wt. % (instead of 0.5%) THPE was used. It was therefore surprising that the viscous behavior of this sample was much better (that is, showed a higher structure viscosity) than that of the samples without higher levels of THPE but not using the early TEA addition.

The invention claimed is:

1. A process for producing a branched polycarbonate composition from dihydric phenol, carbonate precursor, multifunctional phenolic branching agent and monophenolic chain terminator using a coupling catalyst which process comprises the addition of coupling catalyst at separate, different points in the process according to the sequential steps of:

a) combining a dihydric phenol, a tri- or higher functional hydric compound branching agent, base and water to form the reaction mixture, b) then adding at least part of the carbonate precursor and the water immissible organic solvent and reacting the polymerization mixture, partially oligomerizing the dihydric phenol, c) then adding (i) a monophenolic chain terminator and; (ii) a part of the coupling catalyst in an amount of at least about 0.5% of the total coupling agent amount; and (iii) base to the reaction mixture, d) adding the balance of the carbonate precursor (if any) and continuing the reaction of the polymerization mixture, e) adding the balance of the coupling catalyst separate from and after the addition of the first coupling catalyst amount added in step c) after the molecular weight (Mw) of the polymer is at least about 10,000 g/mole, f) completing the polymerization reaction.

2. A process according to claim 1 for producing a branched polycarbonate wherein the coupling catalyst added in step c) is added in the presence of partially oligomerized dihydric phenol before the molecular weight of the polymer is about 10,000 g/mole.

3. A process according to claim 2 for producing a branched polycarbonate wherein the coupling catalyst added in step c) is added to the oligomerizing reaction mixture at the point where the Mw is between about 1,200 and about 1,800 g/mole.

4. A process according to claim 3 for producing a branched polycarbonate wherein the coupling catalyst added in step c) is added to the oligomerizing reaction mixture at the point where the Mw is between about 1,400 and about 1,600 g/mole.

5. A process according to claim 2 for producing a branched polycarbonate wherein the first coupling catalyst added in step c) is added to the oligomerizing reaction mixture at the point where the Mw is at least about 1,200 g/mole.

6. A process according to claim 1 for producing a branched polycarbonate wherein the first addition of the coupling catalyst is in an amount of from 0.5 to 20 mole % of the total coupling catalyst amount that is added.

7. A process according to claim 1 where the coupling catalyst is a tertiary amine compound.

8. A process according to claim 7 where the tertiary amine compound coupling catalyst is selected from the group consisting of trimethylamine, triethylamine, tributylamine, and 4-N,N-dimethylaminopyridine.

9. A process according to claim 1 where the branching agent is a tri- or higher functional phenolic branching agent.

10. A process according to claim 1 where the branching agent is selected from the group consisting of phloroglucin; phloroglucid; 1,1,1 -tri(4-hydroxyphenyl)ethane (THPE); trimellitic acid; trimellitic trichloride (TMTC); pyromellitic acid; benzophenonetetracarboxylic acid and acid chlorides thereof; 2,6-bis(2-hydroxy-5-methylbenzyl)-4-methylphenol and 1,3,5-tri (4-hydroxyphenyl)benzene.

* * * * *